Patented Oct. 25, 1938

2,134,163

UNITED STATES PATENT OFFICE 2,134,163

METHOD OF PREPARING FISH LIVER OILS

Hartley A. Wentworth, Saint Andrews, New Brunswick, Canada

No Drawing. Application October 20, 1936, Serial No. 106,514

8 Claims. (Cl. 87—6)

The invention relates to the production of a fish liver oil, specifically cod liver oil, which will have a high vitamin content particularly in the valuable vitamins A and D, a low free fatty acid content, and which will be substantially free from hydroxylated compounds and other products which now give an objectionable fishy taste and odor to similar oils, and the invention also relates to a novel method for preparing such fish liver oils.

It is the general practice at present in producing fish liver oil, such as cod liver oil, to subject the livers to a cooking process or to a steam trying process to separate the oil from the balance of the liver structure. Fish liver oils which have been subjected to such heat processes are more or less deleteriously affected in that the resulting oil contains certain hydroxylated compounds which give the fishy taste and odors which are so nauseous and objectionable to those who use such oils as a medicinal preparation, and further, such heating treatment has the effect of producing an increase of free fatty acids and, further, heat has the effect of lowering the vitamin content, particularly that of vitamin A.

The primary object of the present invention is to provide a fish liver oil which will be a pure, natural oil in the same condition and with the same inherent constituents in which it exists in the live livers except that it is free of its naturally adherent water, and which oil shall be free of the objectionable properties which characterize the known forms of such oil when subjected to the usual cooking, steaming, or other known heating processes.

Broadly, the present disclosure features what might be termed a cold extraction of the oil from the livers by breaking open the oil containing hepatic cells while at the same time absorbing the water content from the natural oil so released. This is done at the temperature at which the oil flows freely, not materially greater than 70° F. and in any case materially less than 212° F. The invention particularly features the use of a reagent in intimately mixed relation with finely disintegrated liver stock, and which reagent has a high affinity for the water present so as to maintain the operation in a substantially dry condition and which reagent will not absorb but will, on the contrary, be repellent to the oil present and which at the same time will have no reactory effect upon the oil.

More briefly described, a commercially practicable process consists in removing gall bladders and inherent tissue from fresh fish livers and washing the same in a normal saline solution, such as sodium chloride, sea water or the like. The fish livers may be those of the cod, hake, pollock, haddock, halibut, cusk or tuna. The livers so washed are shaken free of any surface adhering water and are roughly dried. The livers are then promptly mixed with beet pulp. This particular pulp has been found suitable, particularly from an economic standpoint, as a reagent which has a high affinity for water and is repellent to the fish liver oil. The proportion of liver to beet pulp used at any time varies with the season of the year, but, in general, four to eight pounds of liver are mixed with one pound of the beet pulp. While the present invention features a dry method of extracting the oil, it has been found that finely grinding the beet pulp and then slightly moistening the same results in a more rapid dehydration of the lever thus speeding up the freeing of the oil. Incidentally, an addition of a slight amount of water to the dry beet pulp forms a more easily pressable liver pulp mixture and a residue which is more easily dehydrated than if a strictly dry beet pulp were used.

While beet pulp is the deliquescent agent which has been found to be most satisfactory due to its low cost and high efficiency, other substances have been used such, for instance, as corn meal, bran, middlings, peet and certain other grains and cereals, all hereinafter identified generically as dehydrated pulp of vegetable origin or specifically as dehydrated pulp of vegetable cereal grains of the type which do not absorb oil but which are capable of breaking down the hepatic cells and absorbing the surface water present as well as the water released from the ruptured cells.

The liver and beet pulp are intimately mixed together for a period of five to ten minutes. The mechanical mixing of the livers has the effect of emaciating them sufficiently to permit the extraction of the oil but it is also suggested that they may be ground prior to being mixed with the deliquescent agent. The batch is then left to rest for a few minutes during which time a large percentage of the oil runs off freely and is conventionally collected. It is economically profitable to abstract the remaining oil by mechanical means as by a filter press or centrifugal machine and by this means 90 to 95% of the original oil content of the livers is recovered.

The oils from both sources are withdrawn conventionally from the remaining solid pulp-liver residue containing the water soaked beet pulp and the cellular structural parts of the livers. This residue is dehydrated and forms the basis for a commercial preparation of an oil cake stock and poultry food.

The natural, water-free oil so produced forms a high grade commercial form of fish liver oil which may be subsequently treated conventionally as by extracting the stearin content to form a particularly pure grade of medicinal oil, such as an odorless cod liver oil.

There is a commercial demand for a flavored fish liver oil and the usual process is to add an extract of the desired flavor to the oil after it has been otherwise finally prepared for medicinal use. It has been found that adding an extract in this manner affects the keeping quality of the oil and oil so treated with flavoring extract commonly disintegrates rather rapidly. It has been found in practicing the method herein featured that if the desired flavoring extract is added to the beet pulp before the beet pulp is mixed into the liver, the addition of the flavoring material apparently has no deleterious effect upon the resulting oil. It is herein suggested, for example, that the leaves of mint be incorporated in the ground beet pulp before the beet pulp is added to the liver. This gives a mint flavor to the resulting oil without affecting the keeping quality of the oil.

The oil extracted by the cold process herein featured either with or without the flavoring extract distinguishes from similar oils now on the market in several aspects such, for instance, a freedom from the usual fishy taste and odor; the practical absence of any free fatty acids and an unimpairment of the vitamins A and D from their condition as when contained in the oil as it exists in the live livers. The prompt removal of the water from the hepatic cells as soon as they are ruptured apparently has the effect of changing the natural, oil-water content of the cells as it exists in the live cells to form what may be regarded as a pure extracted oil, that is, purer than it exists in nature in that it does not have the natural fishy odor or taste and can be kept for a longer period of time than in its natural oil-water combined state.

The fish oil produced by the method herein remains sweet for a longer period of time than known forms of such oils when produced by the heating processes above outlined. Such oils have been kept for long periods of time without becoming rancid and in general the oil is free from those destructive agencies which appear to be introduced by reason of the fact that according to known methods the use of heat has reduced the vitamin content and has formed fatty acids, hydroxylated compounds and other undesirable contents.

The method is an improvement over known methods from an economic standpoint in that a larger percentage of yield of oil is possible following the method herein disclosed, than is possible with the known methods from equal mass of the same liver.

I claim:

1. In the art of extracting oil from fish livers with incidental preparation of a stock food oil cake, the method which consists in subjecting fish livers to the following cold steps under a temperature condition not materially higher than 70° F., removing the gall bladders and adhering tissue, washing the livers in a normal sodium chloride solution, removing the adhering solution to obtain the livers in a substantially dry condition, mixing the livers with slightly moistened beet pulp in the proportion approximately of four to eight pounds of liver to one pound of beet pulp, and for a period of five to ten minutes with incidental macerating of the livers and an intimate mixing of the same with the beet pulp, permitting the first appearing oil to run off, mechanically removing substantially all of the remaining oil, gathering the oil so discharged and dehydrating the solid pulp-liver residue to produce an oil cake stock and poultry food.

2. In the art of extracting oil from fish livers, the method which consists in subjecting fish livers to the following cold steps under a temperature condition not materially higher than 70° F., removing the gall bladders and adhering tissue, washing the livers in a normal, saline solution, mixing the livers with beet pulp in the proportion approximately of four to eight pounds of liver to one pound of beet pump, permitting the first appearing oil to run off, mechanically removing substantially all of the remaining oil, and gathering the oil so discharged.

3. In the art of extracting oil from fish livers, the method which includes the step of mixing finely disintegrated fish liver with beet pulp in the proportion approximately of four to eight pounds of liver to one pound of beet pulp at a temperature materially less than 212° F. and in a substantially dry condition and mechanically separating the resulting oil from the solid liver-pulp residue.

4. In the art of extracting oil from fish livers, the method which consists in intimately mixing fish livers with a dried organic inert deliquescent reagent beet pulp and mechanically separating the resulting oil from the liver-pulp residue while maintaining the same at a temperature materially less than 212° F.

5. In the art of extracting oil from fish livers, the method which consists in mixing the livers with a dehydrated pulp of vegetable cereal origin which does not absorb oil but is capable of breaking down the hepatic cells and absorbing the water present, and mechanically separating the resulting oil from the pulp-liver residue while maintaining the same at a temperature materially less than 212° F.

6. In the art of extracting oil from fish livers, the method which includes the step of mixing finely disintegrated fish livers with an organic inert deliquescent pulp of cereal grain having a water absorbent and oil repellent capacity, said extraction taking place under substantially dry conditions and under a temperature condition not materially higher than that at which the oil will flow freely.

7. In the art of preparing flavored fish liver oil, the method which consists in mixing a saline washed fish liver with beet pulp to which has been previously added a flavoring extract, permitting the mixture to stand for a few minutes and at room temperature and then withdrawing the resulting fish liver oil from the solid beet-liver residue.

8. In the art of preparing fish liver oil, the method which consists in freshly pre-preparing a deliquescent material by mixing beet pulp with mint leaves to form a mint flavored deliquescent agent, intimately mixing the agent into a mass of finely divided dry fish livers and mechanically separating the resulting mint flavored oil from the solid residue.

HARTLEY A. WENTWORTH.